Patented July 27, 1954

2,684,909

UNITED STATES PATENT OFFICE 2,684,909

ZEIN INK VEHICLE

Robert M. Leekley and Morrison N. Stiles, Westport, Conn., assignors to Time, Incorporated, New York, N. Y., a corporation of New York No Drawing. Application September 11, 1951, Serial No. 246,151

11 Claims. (Cl. 106—24)

This invention relates to improvements in fast drying inks for use in high speed printing presses and the like and it relates more particularly to improved types of zein base inks which are characterized by improved press stability and fast drying properties.

Many different types of zein compositions or zein solutions have been proposed heretofore as vehicles in printing inks. The most commonly used type of zein ink vehicle is that in which the zein is dissolved in a relatively volatile solvent for zein such as ethylene glycol, propylene glycol and the like. Inks of this type may be dried by passing the ink on the printed web through a heating zone where the solvent is evaporated to cause the zein to be deposited, together with the pigments suspended therein, on the paper web. In an ink of this type, about 30 to 35% of the solvent must be evaporated to raise the zein to sufficiently high concentration to cause the ink to set. The drying or setting of the ink is usually accomplished by means of radiant heat such as radiant heat lamps or gas burners. The temperature required for fast drying is on the order of 205° C. The use of such high temperatures is disadvantageous for the reason that 205° C. is just under the scorching point of the paper and as a consequence the paper loses 20 to 30% of its tear strength. Inks of this type have other disadvantages which are recognized in the art.

It has also been proposed to produce zein type inks which are set by bringing the ink into an atmosphere of steam to cause precipitation of the zein due to an excess of moisture. Inks of this type are not wholly satisfactory because variations in atmospheric humidity effect the stability of the ink and steam generators and the like are required for operation of the system.

The Leekley United States application Ser. No. 78,000, filed February 23, 1949, now Patent No. 2,622,988, dated December 23, 1952, discloses zein inks which utilize the combination of a solvent for zein and a non-solvent for zein which can be converted into a solvent by the addition of water thereto. Inks of this type will dry at ordinary press room temperatures under normal or average humidity conditions. However, at low humidities such as occur in different sections of the country and especially in the winter, the inks are unstable and unless the press rolls are chilled, the ink tends to set up on the rolls making operation difficult to control without effective humidity regulation.

From the foregoing it will be apparent that the prior zein inks have left considerable to be desired insofar as quick drying and press stability are concerned.

The inks according to the present invention overcome the undesirable characteristics of inks of the type referred to above in that they are stable on the press rolls, insensitive to wide variations in the relative humidity of the atmosphere and readily controlled as to drying temperature so that fast drying of the ink can be obtained at temperatures below the scorching point of the paper web on which the inks are printed, for example, between 90 and 165° C. and even lower.

More particularly, zein inks of the type embodying the present invention, have as a solvent a mixture of a compound which is not a solvent for zein, when alone, but which becomes a solvent in the presence of water or a zein solvent, and a compound which is a recognized solvent for zein. The ink preferably contains water. The zein solvent may be any of a large group of recognized zein solvents, for example, ethylene glycol, propylene glycol, diethylene glycol, methyl or ethyl ether of diethylene glycol, methyl or ethyl ethers of ethylene glycol, methoxymethoxyethanol, 1,3-butanediol, formamide, ethanol formamide, acetamide and ethanol acetamide, or mixtures of the same.

The non-solvents suitable for the new inks fall into a rather limited class which consist of aliphatic compounds which are not zein solvents when used alone and which contain one hydroxyl group plus at least one ether or carbonyl group in the molecule. These compounds must be less volatile than the zein solvent. These compounds are structurally very much alike and are covered by the following general formula:

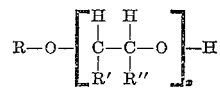

where R' and R" are H or alkyl having 1 to 4 carbon atoms, R is alkyl having 1 to 4 carbon atoms and $x$ is 1, 2 or 3. When R' and R" are both hydrogen, R must be an alkyl having four carbon atoms. The following compounds are representative of this group:

Methyl and ethyl ethers of dipropylene glycol
Methyl and ethyl ethers of tripropylene glycol
Methyl and ethyl ethers of propylene glycol
Butyl ether of diethylene glycol The efficacy of the above-named group of zein nonsolvents resides in their peculiar property of being a poorer solvent for zein (when mixed with a zein solvent) at an elevated temperature than at a lower temperature, i. e., in the vicinity of room temperature. For example, when a zein vehicle containing a mixture of one of the above-named non-solvents and a zein solvent is heated to evaporate the mixture, the zein separates as a cloudy, immiscible liquid phase. If heating is discontinued at this stage and the vehicle is cooled, the zein redissolves producing a clear solution. If heating is continued after the formation of the cloudy suspension or liquid phase, phase separation takes place with the formation of a heavy layer containing a high concentration of zein and a light layer containing only a negligible amount of zein. These layers will not combine readily. When phase separation occurs, an ink containing the zein vehicle sets.

In the ordinary zein vehicle (zein dissolved in a zein solvent) the solvent must be evaporated to cause the zein to attain a sufficiently high concentration to cause the ink to set. Tests have shown that a solution consisting of 20% of zein dissolved in propylene glycol must be heated to evaporate about 32% of the propylene glycol to cause an ink containing the vehicle to set. As contrasted with the setting of the ordinary vehicle, described above, our new ink requires much less of the solvent to be evaporated to produce phase separation. For example, only about 12% of the volatiles in an ink vehicle embodying the present invention containing 20% of zein dissolved in methyl ether of tripropylene glycol and ethylene glycol need be evaporated to cause phase separation and setting of the ink.

A typical ink embodying the present invention may contain, as an ink vehicle, commercial zein 20%, commercial methyl ether of tripropylene glycol (Dowanol 62B, a product of the Dow Chemical Corp.) 40 to 50%, and commercial ethylene glycol 30 to 40%. To this vehicle may be added pigment or coloring material in an amount between about 10 and 35% by weight.

The zein, the solvent, and the non-solvent when used in their commercially available form contain up to about 5% water. The components of the zein vehicle may be completely moisture free. The ink is not very critical as to moisture content and satisfactory inks have been produced with moisture contents as high as 40%. However, inasmuch as high moisture contents have a tendency to reduce the stability of the ink, due to evaporation, at low relative humidity, of the water, it is preferred to maintain the water content of the ink below 10%.

The zein concentration is susceptible to considerable modification and may run between 5 and 30% with the preferred range for letter press inks in the range of 15 to 25%.

As explained above, other solvents than ethylene glycol may be used in the ink. However, use of different solvents will have an effect upon the temperature at which the zein separates from the solvent, non-solvent mixture. Quite unexpectedly, for example, it has been found that an ink containing ethylene glycol as a solvent component sets more quickly than an ink containing propylene glycol as a solvent component although the latter is more volatile. This unexpected result appears to arise because, at the same evaporating temperature, the vehicle containing propylene glycol retains a greater amount of the glycol in the zein layer than a similar vehicle containing ethylene glycol. The fact that ethylene glycol forms an azeotropic mixture with the non-solvent, for example, methyl ether of tripropylene glycol, whereas propylene glycol and the same non-solvent do not form an azeotropic mixture, appears to have no effect upon the speed of drying or phase separation of the zein.

It has been found that a relation exists between the setting temperature of the ink and the concentration of the solvent in the mixture. Thus, for example, 20 parts of zein dissolved in 80 parts of a solvent containing 24% of ethylene glycol and 76% of methyl ether of tripropylene glycol produces a vehicle in which phase separation occurs in the vicinity of 30° C. When the concentration of ethylene glycol in the solvent is increased to 33%, phase separation occurs at about 160° C.

A vehicle containing 20 parts of zein dissolved in 80 parts of a solvent containing 25½% propylene glycol and 74½% methyl ether of tripropylene glycol has a phase separation temperature of about 30° C. while at higher concentrations the phase separation temperatures are almost the same as those of ethylene glycol.

It will be apparent that as the amount of zein solvent in the mixture decreases, either because of evaporation or because of an initially lower concentration, the phase separation temperature also decreases.

It is found further that when 1,3-butanediol, methoxymethoxyethanol, methyl ether of ethylene glycol or methyl ether of diethylene glycol is used as a solvent, phase separation occurs at both a high temperature and a much lower temperature so that the phase separation curve is almost parabolic in shape. For example, when 1,3-butanediol is used as a solvent, phase separation occurs at 35% concentration of the solvent at about 15° C. and at 157° C. The other solvents must be used in varying proportions to the non-solvents in order to bring the phase separation into a desired range.

From the preceding comments, it will be apparent that the setting temperature of the ink can be regulated by varying the proportions of the solvent and non-solvent. Thus, when the proportion of zein solvent is relatively low, phase separation takes place at low temperature without the application of heat so that the ink is unstable. On the other hand, if the proportion of solvent is raised into a range of 30 to 40%, phase separation takes place in a range between about 85° C. and 165° C., the temperature being controllable by variation in the proportion of the solvent.

The initial concentration of zein does not have a very great effect on the phase separation or setting temperature of the ink. Thus, a 15% zein solution in a solvent vehicle containing ethylene glycol and methyl ether of tripropylene glycol has a phase separation temperature of only about 12° to 14° C. higher than a vehicle containing 30% zein. Thus, while an increase in the zein concentration lowers the phase separation temperature, the change is not nearly as great as that produced by changing the concentration of the solvent in the vehicle.

As explained above, it is possible to regulate the ink to cause phase separation at different temperatures. For example, typical vehicles having a phase separation temperature of 80° C. may have the following composition:

| | Per cent |
|---|---|
| Zein | 20 |
| Ethylene glycol | 26.8 |
| Methyl ether of tripropylene glycol | 53.2 | or

| | Per cent |
|---|---|
| Zein | 20 |
| Propylene glycol | 27.7 |
| Methyl ether of tripropylene glycol | 52.3 |

Usually, it is preferred to operate in a higher temperature range in order to improve the stability of the ink and, accordingly, the proportion of solvent preferably should be higher than 30%.

Vehicles containing, for example, ethylene glycol, propylene glycol, 1,3-butanediol, ethanol acetamide, ethanolformamide in an amount between 30 and 40% have phase separation temperatures between about 85° C. and 165° C.

The proportion of the zein non-solvent in the zein vehicle will, of course, be varied inversely as the proportion of zein solvent is increased and decreased. Any of the above-named non-solvents can be used with essentially equivalent results in the proportions specified above, although the ratio of solvent to non-solvent will vary slightly to produce a desired phase separation or setting temperature.

Inks of the type containing the zein solvent and a non-solvent of the type specified above have much less tendency to dry on the press rolls, the rolls of the press do not need to be chilled and the ink operates satisfactorily independently of the atmosphere humidity so long as the ink initially has a substantial proportion of water present in it.

It will be understood that the ratios of zein solvent, non-solvent and water are susceptible to considerable variation in order to control the setting temperature and that they can be varied for different kinds of printing operations and for different press speeds, as may be desired. Accordingly, the specific examples given above should be considered as illustrative and not as limiting the scope of the following claims.

We claim:

1. A zein ink vehicle consisting essentially of between about 5 to 30% zein, 30 to 40% of an oxygen-containing aliphatic compound containing no other element than carbon, hydrogen, oxygen and nitrogen and in which zein is soluble; and between about 40% and 50% of a non-solvent for zein of the class consisting of butyl ether of diethylene glycol, methyl and ethyl ethers of propylene glycol, methyl and ethyl ethers of dipropylene glycol and methyl and ethyl ethers of tripropylene glycol; and the remainder essentially water.

2. A zein ink vehicle which sets in a range between about 85° C. and 165° C. by the application of heat thereto, said ink comprising an ink base consisting essentially of between about 5% and 30% zein, water in an amount up to 10%, between about 30% and 40% of an oxygen-containing aliphatic compound containing no other element than carbon, hydrogen, oxygen and nitrogen and in which zein is soluble and between about 40% and 50% of a compound which is a non-solvent for zein of the general formula

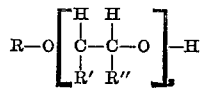

where R' and R" are H or an alkyl having 1 to 4 carbon atoms, R is an alkyl having 1 to 4 carbon atoms and $x$ is 1 to 3, and when R' and R" are both H, then R must be an alkyl having four carbon atoms.

3. A zein ink vehicle consisting essentially of between about 15% and 25% zein; about 30% to 40% of ethylene glycol; between about 40% and 50% of methyl ether of tripropylene glycol and less than 10% water.

4. A zein ink vehicle consisting essentially of between about 15% and 25% zein; about 30% to 40% of propylene glycol; between about 40% and 50% of ethyl ether of tripropylene glycol and less than 10% water.

5. A zein ink vehicle consisting essentially of between about 15% and 25% zein; about 30% to 40% of ethylene glycol; between about 40% and 50% of ethyl ether of tripropylene glycol and less than 10% water.

6. A zein ink vehicle consisting essentially of between about 15% and 25% zein; about 30% to 40% of ethylene glycol; between about 40% and 50% of butyl ether of diethylene glycol and less than 10% water.

7. A zein ink vehicle consisting essentially of between about 15% and 25% zein; about 30% to 40% of propylene glycol; between about 40% and 50% of methyl ether of tripropylene glycol and less than 10% water.

8. A zein ink vehicle comprising between about 5 and 30% zein dissolved in a solvent consisting essentially of at least 24% of an oxygen-containing aliphatic compound containing no other element than carbon, hydrogen, oxygen and nitrogen and in which zein is soluble, water and a non-solvent for zein of the class consisting of butyl ether of diethylene glycol, methyl and ethyl ethers of propylene glycol, methyl and ethyl ethers of dipropylene glycol and methyl and ethyl ethers of tripropylene glycol; the proportion of non-solvent being at least as great as the proportion of solvent and the water being present in an amount up to about 10%.

9. A zein ink vehicle comprising between about 5 and 30% zein dissolved in a solvent consisting essentially of at least 24% of an oxygen-containing aliphatic compound containing no other element than carbon, hydrogen, oxygen and nitrogen and in which zein is soluble, water and methyl ether of tripropylene glycol, methyl ether of tripropylene glycol being a non-solvent for zein and being present in a proportion at least as great as the proportion of zein solvent and the water being present in an amount up to about 10%.

10. A zein ink vehicle comprising between about 5 and 30% zein dissolved in a solvent consisting essentially of at least 24% of ethylene glycol, water and methyl ether of tripropylene glycol, methyl ether of tripropylene glycol being a non-solvent for zein and being present in a proportion at least as great as the proportion of ethylene glycol and the water being present in an amount up to about 10%.

11. A zein ink vehicle comprising between about 5 and 30% zein dissolved in a solvent consisting essentially of at least 24% of propylene glycol, water and methyl ether of tripropylene glycol, methyl ether of tripropylene glycol being a non-solvent for zein and being present in a proportion at least as great as the proportion of propylene glycol and the water being present in an amount up to about 10%.

References Cited in the file of this patent

UNITED STATES PATENTS

| Number | Name | Date |
|---|---|---|
| 2,115,716 | Hansen | May 3, 1938 |
| 2,153,130 | Baxter | Apr. 4, 1939 |
| 2,185,110 | Coleman | Dec. 26, 1939 |
| 2,229,870 | Pearce | Jan. 28, 1941 |
| 2,354,393 | Manley | July 25, 1944 |
| 2,355,056 | Coleman | Aug. 8, 1944 |
| 2,433,029 | Coleman | Dec. 23, 1947 |